US012188422B2

(12) United States Patent
Persson et al.

(10) Patent No.: US 12,188,422 B2
(45) Date of Patent: Jan. 7, 2025

(54) METHOD FOR OPERATING AN INTERNAL COMBUSTION ENGINE SYSTEM USING HYDROGEN FUEL

(71) Applicant: Volvo Truck Corporation, Gothenburg (SE)

(72) Inventors: Håkan Persson, Torslanda (SE); Karsten Rohrssen, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/584,268

(22) Filed: Feb. 22, 2024

(65) Prior Publication Data

US 2024/0295195 A1 Sep. 5, 2024

(30) Foreign Application Priority Data

Mar. 3, 2023 (EP) .................................... 23159919

(51) Int. Cl.

| | |
|---|---|
| ***F02D 41/00*** | (2006.01) |
| ***F02D 41/38*** | (2006.01) |
| ***F02M 45/02*** | (2006.01) |

(52) U.S. Cl.
CPC ......... *F02D 41/0027* (2013.01); *F02D 41/38* (2013.01); *F02M 45/02* (2013.01)

(58) Field of Classification Search
CPC ...... F02D 41/0027; F02D 41/38; F02D 45/02; F02M 21/00; F02M 21/02; F02M 21/0206; F02M 21/0248
See application file for complete search history.

(56) References Cited

U.S. PATENT DOCUMENTS

| | | | |
|---|---|---|---|
| 8,839,762 | B1 | 9/2014 | Chiera et al. |
| 9,890,689 | B2 | 2/2018 | Hampson et al. |

(Continued)

FOREIGN PATENT DOCUMENTS

| | | | |
|---|---|---|---|
| DE | 102017004196 | B4 | 11/2018 |
| EP | 2700796 | A1 | 2/2014 |

(Continued)

OTHER PUBLICATIONS

Extended European Search Report, European Application No. 23159919.2, mailed Sep. 7, 2023, 5 pages.

*Primary Examiner* — Grant Moubry
(74) *Attorney, Agent, or Firm* — Sage Patent Group

(57) ABSTRACT

A method for operating an internal combustion engine system using gaseous fuel is disclosed. The method includes injecting, by activating a fuel injector to generate a first injection in association with a compression stroke, a first amount of gaseous fuel into a pre-combustion chamber, wherein the first injection and the first amount of gaseous fuel are adapted so that an ignitable fuel-air mix is formed in the pre-combustion chamber but not in a main combustion chamber; igniting, by activating an igniter, the ignitable fuel-air mix in the pre-combustion chamber formed by the first injection; and injecting, by activating the fuel injector to generate a second injection after ignition of the first amount of fuel, a second amount of gaseous fuel into the pre-combustion chamber, wherein the second injection and the second amount of gaseous fuel are adapted so that fuel is forced through the orifices into the main combustion chamber.

18 Claims, 4 Drawing Sheets

(56) References Cited

U.S. PATENT DOCUMENTS

| | | | | |
|---|---|---|---|---|
| 2008/0017165 | A1 | 1/2008 | Schubert | |
| 2014/0060479 | A1 | 3/2014 | Tozzi et al. | |
| 2016/0160742 | A1 | 6/2016 | Willi et al. | |
| 2017/0096932 | A1 | 4/2017 | Chiera et al. | |
| 2017/0122184 | A1* | 5/2017 | Hampson .............. | F02D 41/402 |
| 2017/0328266 | A1 | 11/2017 | Bär | |
| 2018/0038270 | A1 | 2/2018 | Tozzi et al. | |
| 2018/0135506 | A1 | 5/2018 | Grover, Jr. et al. | |
| 2021/0189946 | A1 | 6/2021 | Schock et al. | |
| 2022/0112835 | A1 | 4/2022 | Bunce et al. | |
| 2024/0093635 | A1* | 3/2024 | Robinson .............. | F02B 19/108 |

FOREIGN PATENT DOCUMENTS

| | | | | |
|---|---|---|---|---|
| EP | 2998539 | A1 * | 3/2016 | .......... F02B 19/1019 |
| WO | 2010072519 | A1 | 7/2010 | |
| WO | 2016057556 | A1 | 4/2016 | |
| WO | 2016057557 | A1 | 4/2016 | |
| WO | 2019141728 | A1 | 7/2019 | |
| WO | 2020229775 | A1 | 11/2020 | |
| WO | 2021214511 | A1 | 10/2021 | |
| WO | 2022011400 | A1 | 1/2022 | |

* cited by examiner

METHOD FOR OPERATING AN INTERNAL COMBUSTION ENGINE SYSTEM USING HYDROGEN FUEL

CROSS REFERENCE TO RELATED APPLICATIONS

This application claims priority to European Patent Application No. 23159919.2, filed on Mar. 3, 2023, the disclosure and content of which is incorporated by reference herein in its entirety.

TECHNICAL FIELD

The disclosure relates generally to operation of an internal combustion engine system. In particular aspects, the disclosure relates to a method for operating an internal combustion engine system using gaseous fuel, in particular hydrogen. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

To reduce negative climate effects there is an increasing interest in reducing the use of fossil fuels. One possibility is to use hydrogen gas, produced in a fossil-free way, as fuel in internal combustion engines instead of using e.g., fossil-based diesel. The huge amount of conventional, already existing, diesel engines cannot operate properly if simply just fed with hydrogen instead of diesel; these engines must be adapted before being capable of using hydrogen fuel. To make such adaptation of existing diesel engines economically feasible, it is necessary that the adaptations are not too complex and costly.

U.S. Pat. No. 9,890,689B2 discloses an example of combusting gaseous fuel, in this case natural gas, in a diesel-type internal combustion engine. Besides the conventional components of a diesel engine system, the engine of U.S. Pat. No. 9,890,689B2 is equipped with an igniter and a pre-combustion chamber. The method includes injecting a first large amount of fuel ("the majority of the fuel charge in the cycle") into the main combustion chamber (directly or via the pre-combustion chamber) at an early stage of the compression stroke, starting at around 150 crank angle degrees, CAD, before top dead center, TDC. A portion of the fuel-air mixture in the main combustion chamber is then pressed, during the compression stroke, into the pre-combustion chamber where it is ignited by the igniter at around 10 CAD before TDC. A small amount of fuel is injected, in one or two injections, into the pre-combustion chamber after ignition.

SUMMARY

The present disclosure is based on the inventor's realization that the method and arrangement of U.S. Pat. No. 9,890,689B2 may possibly be suitable when using natural gas as fuel in a modified diesel engine system provided the pressure in the engine is lower than what is normally the case in modern heavy vehicle diesel engines, which might be handled if the modification of the diesel engine includes changing pistons to low-pressure pistons, but that the method and arrangement of U.S. Pat. No. 9,890,689B2 may lead to knocking problems (inadequate timing of ignition etc.) because of inadequate mixing or distribution of fuel and air if the pressure is higher, i.e., if the pressure is of a magnitude common in modern diesel engines, at least if the fuel is hydrogen gas that has other properties and behaves in a different way than natural gas and other similar gases.

There is thus still a need for methods and arrangements suitable for operating a diesel engine on hydrogen gas or other gaseous fuel without having to modify the engine to operate at a lower pressure.

According to a first aspect of this disclosure it relates to a method for operating an internal combustion engine system using gaseous fuel, wherein the internal combustion engine system comprises:

- a piston arranged to reciprocate in a cylinder between a bottom dead center (BDC) and a top dead center (TDC), wherein a position of the piston during a compression stroke when the piston moves towards the TDC can be represented by −180° crank angle degrees (CAD) at the BDC and 0° CAD at the TDC;
- a main combustion chamber arranged at an end portion of the cylinder so that an upper surface of the piston defines a lower side of the main combustion chamber;
- an inlet valve and an exhaust valve arranged to regulate flow of air and exhaust gas to and from the main combustion chamber;
- a pre-combustion chamber arranged in association with the main combustion chamber, wherein the pre-combustion chamber is provided with one or more orifices allowing fluid communication between the pre-combustion chamber and the main combustion chamber;
- a fuel injector arranged to inject gaseous fuel into the pre-combustion chamber; and
- an igniter arranged to ignite a fuel-air mix present in the pre-combustion chamber, the method comprising:

- injecting, by activating the fuel injector to generate a first injection in association with a compression stroke, a first amount of gaseous fuel into the pre-combustion chamber, wherein the first injection and the first amount of gaseous fuel are adapted so that an ignitable fuel-air mix is formed in the pre-combustion chamber but not in the main combustion chamber,
- igniting, by activating the igniter, the ignitable fuel-air mix in the pre-combustion chamber formed by the first injection,
- injecting, by activating the fuel injector to generate a second injection after ignition of the first amount of fuel, a second amount of gaseous fuel into the pre-combustion chamber, wherein the second injection and the second amount of gaseous fuel are adapted so that fuel is forced through the orifices into the main combustion chamber.

The method of this disclosure provides for a controlled initial mixing of fuel (typically $H_2$, but natural gas and other similar gases are also possible) and air in the pre-combustion chamber followed by ignition and a controlled combustion of the fuel-air mix present in the pre-combustion chamber after the first injection. The pre-combustion chamber has typically a significantly smaller volume than the main combustion chamber. The combustion generates temperature and pressure increase in the pre-combustion chamber forcing the burning mix out through the orifices into the air-filled (and essentially fuel-free) main combustion chamber where it forms hot zones. While the burning fuel-air mix is forced through the orifices, the second amount of fuel is injected through the pre-combustion chamber in the second injection. The second amount of fuel is typically much larger than the first amount of fuel, often ten times larger depending on the load of the engine. This second amount of fuel forces the burning fuel mix remaining in the pre-combustion out through orifices into the main combustion chamber. A major part of the second amount of fuel starts to burn outside of the pre-combustion chamber and forms burning jet sprays in the main combustion chamber. This allows for a controlled combustion of the second amount of fuel, i.e., the major part of the fuel in each engine cycle, in the main combustion chamber.

The first injection, that may be denoted pilot injection, may have a duration of only a few crank angle degrees (CAD) and may in principle be initiated any time during a compression stroke from intake valve closing to shortly before the ignition. The natural gas and other similar gases fuel and the air should be sufficiently well mixed and should be mixed in a sufficiently proper proportion at the time when the igniter is activated. If the first amount of fuel is injected at an early stage of the compression stroke into the pre-combustion chamber, air will be forced through the orifices into the pre-combustion chamber for some time during the compression stroke and mix with the fuel so as to form an ignitable fuel-air mix therein. Another approach is to perform the first injection of gaseous fuel rather late during the compression stroke. By injecting a proper (first) amount of fuel having a proper pressure, this late first fuel injection will create the ignitable fuel-air mix in the pre-combustion chamber.

Exactly how to set timing and fuel amount in this first injection depends on the specific design of the engine system including, for instance, the volume of the pre-combustion chamber, the volume relationship between the two chambers, the geometry of the combustion chambers and the orifices, the fuel injection pressure, and the type and size of the engine. In any case, the purpose is to generate an ignitable fuel-air mix in the pre-combustion chamber only, not in the main combustion chamber outside of the pre-combustion chamber, so that the combustion can be controlled in a better way. (A small fraction of ignitable fuel-air mix may of course leak out through the orifices before ignition.)

The igniter is activated when the fuel and air has been properly mixed in the pre-combustion chamber and slightly, maybe 5-10 CAD, before the second injection, and typically relatively close to the TDC (0° CAD). As an example, if the second injection is initiated at −5° CAD, ignition may be performed at −10° CAD.

The second injection may have a duration of around 10° CAD and may be initiated at around 0° CAD. The amount of fuel in the second injection (the second amount) may be around 20 times higher than the amount of fuel in the first injection (the first amount) at high engine loads. The combustion of this second, main amount of fuel is well controlled since it does not rely on that fuel and air have been properly mixed in the entire main combustion chamber but instead this main amount of fuel is forced through the orifices and starts to burn in the main combustion chamber when contacted with burning fuel from the first injection or with hot zones created by combustion of the first amount of fuel.

As a comparison, if hydrogen was to be combusted as proposed in U.S. Pat. No. 9,890,689B2 where there is a first injection of a relatively large amount of fuel into the entire main combustion chamber, it is likely that the hydrogen and the air will not be sufficiently homogeneously mixed throughout the main combustion chamber, which would lead to an uncontrolled combustion and thus to knocking problems, at least if operating the engine with a high pressure in line with what is used in a typical diesel engine. This is avoided in the method of the present disclosure where the ignitable fuel-air mix instead is formed in the pre-combustion chamber, and with a much smaller amount of fuel, and where the major part of the fuel is combusted when sprayed out through the orifices into the main combustion chamber.

The internal combustion engine of this disclosure may be of a conventional type operating according to a four-stroke cycle (intake, compression, expansion, exhaust) and with the piston connected via a rod to a crank shaft that rotates 1800 per stroke. In a free-piston engine or other type of engine where the piston is not connected to a crankshaft, the position of the piston in the cylinder may still be represented by crank angle degrees (CAD).

In some examples the second amount of fuel is larger than the first amount of fuel.

In some examples the second amount of fuel is at least 50% larger, or at least 100% larger, or at least 500% larger, than the first amount of fuel.

In some examples a duration of the first injection is less than 5° CAD.

In some examples the duration of the first injection is 0.5-2° CAD.

In some examples a duration of the second injection is >0.5° CAD, or >1° CAD.

In some examples the duration of the second injection is <20° CAD, or <15° CAD.

In some examples the first injection is initiated somewhere between −160° and −10° CAD, or between −160° and −45° CAD.

In some examples the first injection is initiated after −110° CAD.

In some examples the first injection is initiated before −45° CAD.

In some examples the ignition is initiated somewhere between −45° and +10° CAD, or between −20° and −10° CAD.

In some examples the second injection is initiated somewhere between −10° and +10° CAD.

In some examples the second injection is initiated at or after −5° CAD.

In some examples the first injection is initiated at or before 0° CAD.

In some examples the gaseous fuel is hydrogen gas.

According to a second aspect of the disclosure it relates to an internal combustion engine system comprising:

- a piston arranged to reciprocate in a cylinder between a bottom dead center (BDC) and a top dead center (TDC), wherein a position of the piston during a compression stroke when the piston moves towards the TDC can be represented by −180° crank angel degrees (CAD) at the BDC and 0° CAD at the TDC;
- a main combustion chamber arranged at an end portion of the cylinder so that an upper surface of the piston defines a lower side of the main combustion chamber;
- an inlet valve and an exhaust valve arranged to regulate flow of air and exhaust gas to and from the main combustion chamber;
- a pre-combustion chamber arranged in association with the main combustion chamber, wherein the pre-combustion chamber is provided with one or more orifices allowing fluid communication between the pre-combustion chamber and the main combustion chamber;
- a fuel injector arranged to inject gaseous fuel into the pre-combustion chamber; and
- an igniter arranged to ignite a fuel-air mix present in the pre-combustion chamber, and a control circuitry configured to:

inject, by activating the fuel injector to generate a first injection in association with a compression stroke, a first amount of gaseous fuel into the pre-combustion chamber, wherein the first injection and the first amount of gaseous fuel are adapted so that an ignitable fuel-air mix is formed in the pre-combustion chamber but not in the main combustion chamber, ignite, by activating the igniter, the ignitable fuel-air mix in the pre-combustion chamber formed by the first injection, and inject, by activating the fuel injector to generate a second injection after ignition of the first amount of fuel, a second amount of gaseous fuel into the pre-combustion chamber, wherein the second injection and the second amount of gaseous fuel are adapted so that fuel is forced through the orifices into the main combustion chamber.

According to a third aspect of the disclosure it relates to a vehicle provided with an internal combustion engine system according to above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
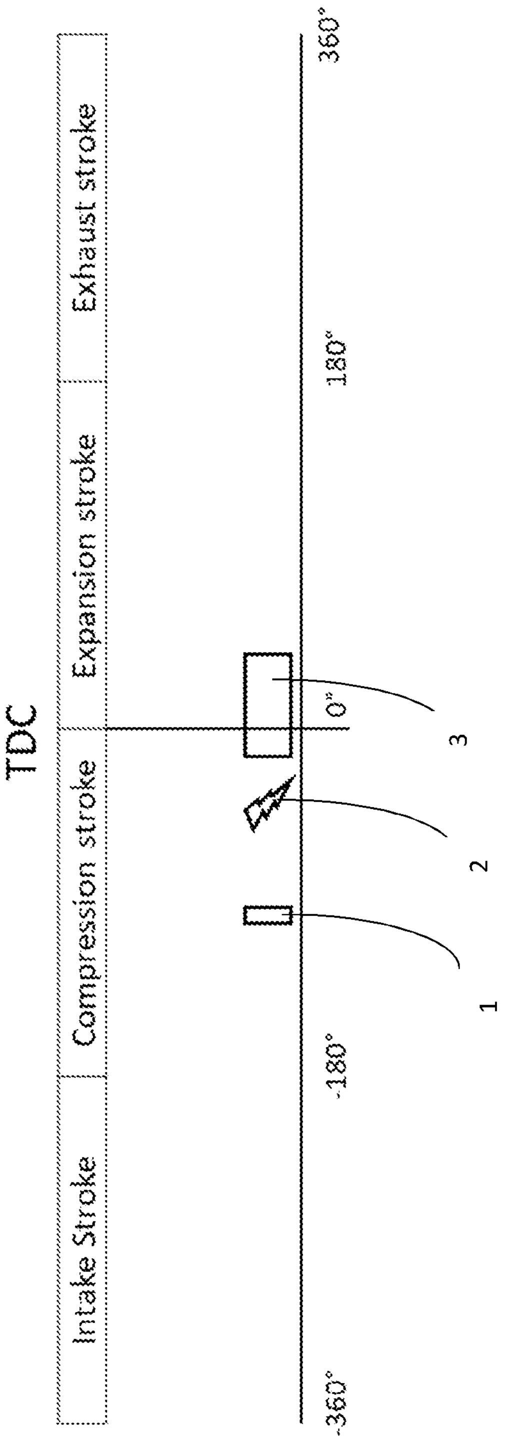
FIG. 1 is an exemplary view of timing of fuel injection and ignition according to this disclosure.

FIG. 1 illustrates an example of timing for a first fuel (hydrogen) injection 1, an ignition 2 and a second fuel (hydrogen) injection 3 for an internal combustion engine operating according to a four-stroke cycle with an intake stroke starting at −360° (crank angel degrees, CAD), a compression stroke starting at −180°, an expansion stroke starting at 0°, and an exhaust stroke starting at 180°.

As shown in FIG. 1, the first injection 1 has a relatively short duration and is in this example carried out at around −110° CAD. The ignition 2 is carried out at around −20° CAD and the second injection is initiated at around −10° CAD. The second injection 2 involves injection of a second amount of fuel that may be 10 times larger than a first amount of fuel injected in the first injection 1. A duration of the second fuel injection is around 30° CAD.

Figure 2:
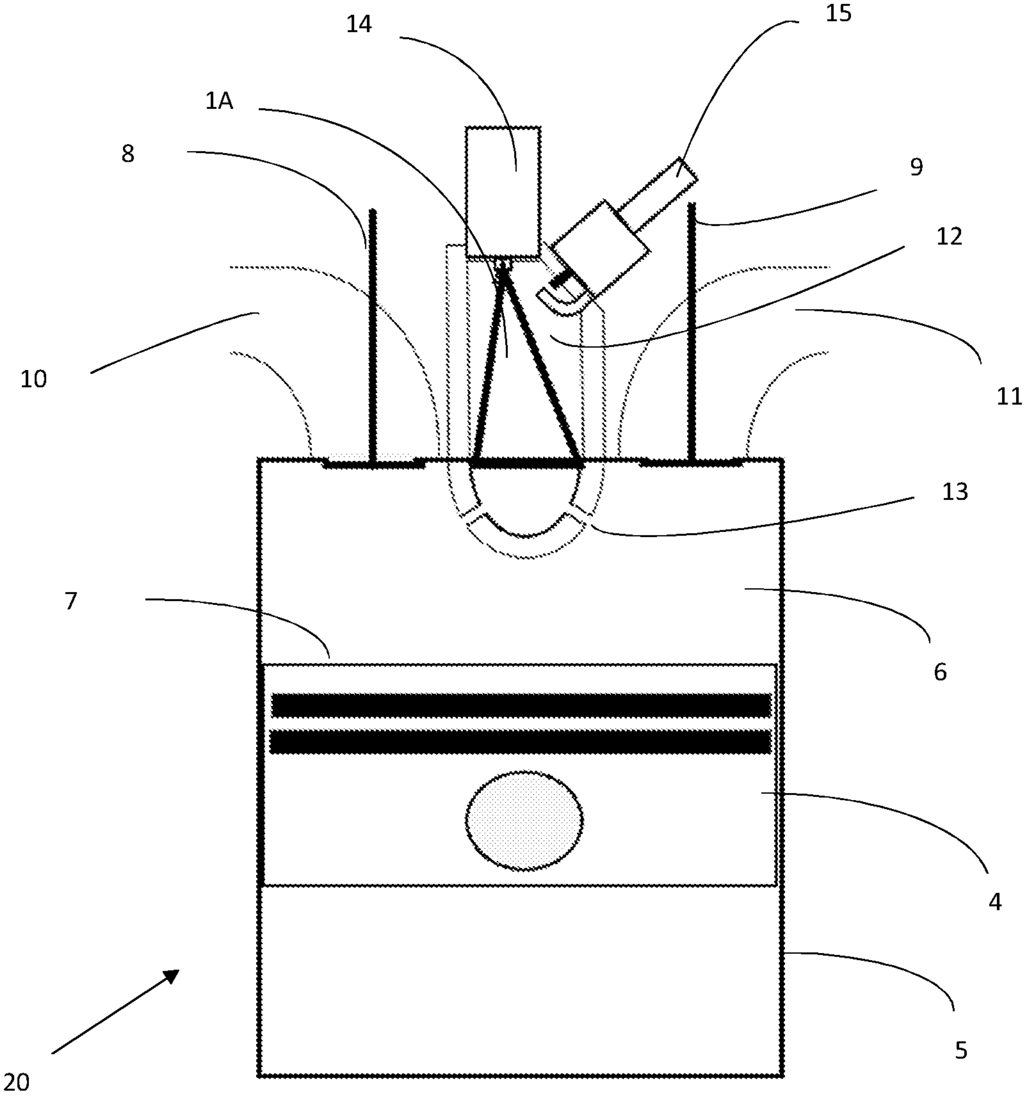
FIGS. 2-4 show schematically the combustion process according to this disclosure.
Figure 3:
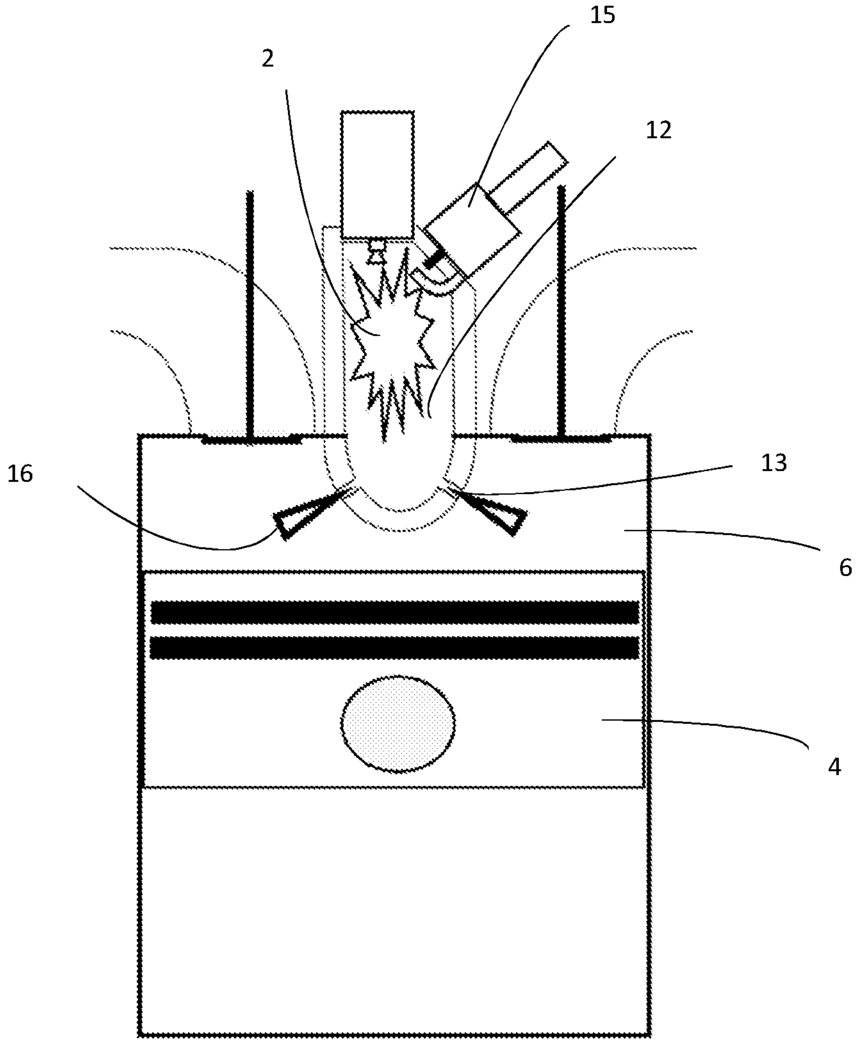
Figure 4:
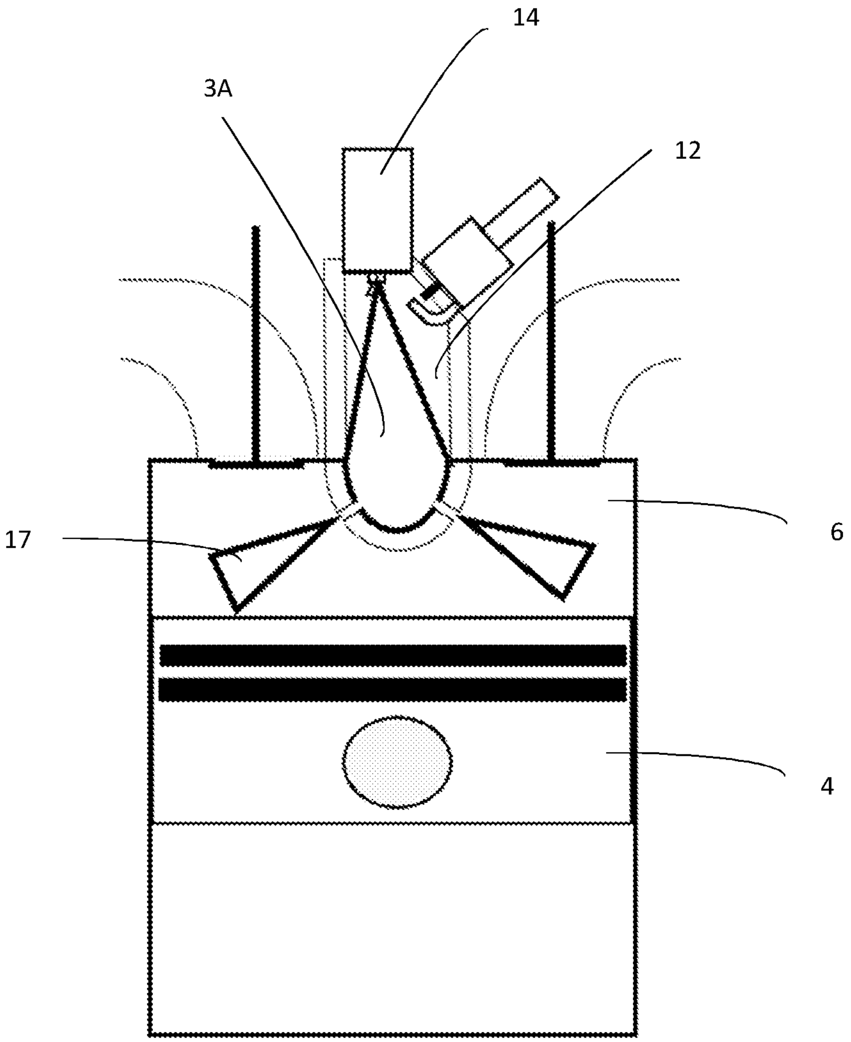

FIGS. 2-4 show a part of an internal combustion engine system 20 comprising a piston 4 arranged to reciprocate in a cylinder 5 between a bottom dead center (BDC, not shown) and a top dead center (TDC, roughly as positioned in FIG. 3). With reference to FIG. 1, the piston is in the TDC position at −360°, 0° and 360° CAD. The piston 4 is via a connection rod (not shown) connected to a crank shaft (not shown) in line with a conventional internal combustion engine.

FIGS. 2-4 further show a main combustion chamber 6 arranged at an end portion of the cylinder 5 so that an upper surface 7 of the piston 4 defines a lower side of the main combustion chamber 6. An inlet valve 8 and an exhaust valve 9 are arranged to regulate flow of air and exhaust gas to and from the main combustion chamber 6 via corresponding ducts 10, 11.

A pre-combustion chamber 12 is arranged in association with the main combustion chamber 6. In this case the pre-combustion chamber 12 is located partly outside of the main combustions chamber 6. The pre-combustion chamber 12, or rather a wall defining the pre-combustion chamber 12, is provided with a plurality of orifices 13 allowing fluid communication between the pre-combustion chamber 12 and the main combustion chamber 6.

A fuel injector 14 is arranged to inject hydrogen fuel into the pre-combustion chamber 12. The injector 14 is arranged so that a fuel outlet thereof is enclosed by the pre-combustion chamber 12.

An igniter 15, such as a spark plug or similar, is arranged to ignite a fuel-air mix present in the pre-combustion chamber.

FIG. 2 shows the situation when the first injection 1 just has been performed by the injector 14 so that the first amount of fuel 1A just has been injected into the pre-combustion chamber 12. The piston 4 is here positioned at, for instance, −100° CAD and is moving towards the TDC in the compression stroke. Air in the main combustion chamber 6 is compressed and forced through the orifices 13 into the pre-combustion chamber 12 and mixes therein with the first amount of fuel 1A.

FIG. 3 shows the situation when the igniter 15 just has been activated so as to ignite the fuel-air mix in the pre-combustion chamber 12. Temperature and pressure increases rapidly in the pre-combustion chamber 12 and burning fuel-mix is forced through the orifices 13 into the main combustion chamber 6 (indicated by small jets 16). The piston 4 is here close to TDC.

FIG. 4 shows the situation when the second injection 3 just has been performed by the injector 14 so that the second (larger) amount of fuel 3A just has been injected into the pre-combustion chamber 12. Because the second amount of fuel 3A is sufficiently large and has a sufficiently high pressure, it is forced further through the orifices 13 into the main combustion chamber 6 (indicated by large jets 17). Some portion of the second amount of fuel 3A may start burning (i.e., reacting with oxygen in the air) inside the pre-combustion chamber 12 but a large portion will push burning fuel in front of itself into the main combustion chamber 6 and start burning only after having entered the main combustion chamber 6. In FIG. 4, the piston 4 has passed the TDC and has started moving towards the BDC.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for operating an internal combustion engine system using gaseous fuel, wherein the internal combustion engine system comprises:

a piston arranged to reciprocate in a cylinder between a bottom dead center (BDC) and a top dead center (TDC), wherein a position of the piston during a compression stroke when the piston moves towards the TDC can be represented by −180° crank angle degrees (CAD) at the BDC and 00 CAD at the TDC;

a main combustion chamber arranged at an end portion of the cylinder so that an upper surface of the piston defines a lower side of the main combustion chamber;

an inlet valve and an exhaust valve arranged to regulate flow of air and exhaust gas to and from the main combustion chamber;

a pre-combustion chamber arranged in association with the main combustion chamber, wherein the pre-combustion chamber is provided with one or more orifices allowing fluid communication between the pre-combustion chamber and the main combustion chamber;

a fuel injector arranged to inject gaseous fuel into the pre-combustion chamber; and an igniter arranged to ignite a fuel-air mix present in the pre-combustion chamber, the method comprising:

injecting, by activating the fuel injector to generate a first injection in association with a compression stroke, a first amount of gaseous fuel into the pre-combustion chamber, wherein the first injection and the first amount of gaseous fuel are adapted so that an ignitable fuel-air mix is formed in the pre-combustion chamber but not in the main combustion chamber, igniting, by activating the igniter, the ignitable fuel-air mix in the pre-combustion chamber formed by the first injection, injecting, by activating the fuel injector to generate a second injection after ignition of the first amount of gaseous fuel, a second amount of gaseous fuel into the pre-combustion chamber, wherein the second injection and the second amount of gaseous fuel (3A) are adapted so that fuel is forced through the orifices into the main combustion chamber.

2. The method of claim 1, wherein the second amount of gaseous fuel is larger than the first amount of gaseous fuel.

3. The method of claim 2, wherein the second amount of gaseous fuel is at least 50% larger, or at least 100% larger, or at least 500% larger, than the first amount of gaseous fuel.

4. The method of claim 1, wherein a duration of the first injection is less than 5° CAD.

5. The method of claim 4, wherein the duration of the first injection is 0.5-2° CAD.

6. The method of claim 1, wherein a duration of the second injection (3) is >0.5° CAD, or >1° CAD.

7. The method of claim 6, wherein the duration of the second injection is <20° CAD, or <15° CAD.

8. The method of claim 1, wherein the first injection is initiated somewhere between −160° and −10° CAD.

9. The method of claim 1, wherein the first injection is initiated somewhere between −160° and −45° CAD.

10. The method of claim 9, wherein the first injection is initiated after −110° CAD.

11. The method of claim 9, wherein the first injection is initiated before −10° CAD, or before −45° CAD.

12. The method of claim 1, wherein the ignition is initiated somewhere between −45° and +10° CAD, or between −20° and −10° CAD.

13. The method of claim 1, wherein the second injection is initiated somewhere between −10° and +10° CAD.

14. The method of claim 13, wherein the second injection is initiated at or after −5° CAD.

15. The method of claim 13, wherein the first injection is initiated at or before 0° CAD.

16. The method of claim 1, wherein the gaseous fuel is hydrogen gas.

17. An internal combustion engine system comprising:

a piston arranged to reciprocate in a cylinder between a bottom dead center (BDC) and a top dead center (TDC), wherein a position of the piston during a compression stroke when the piston moves towards the TDC can be represented by −180° crank angel degrees (CAD) at the BDC and 0° CAD at the TDC;

a main combustion chamber arranged at an end portion of the cylinder so that an upper surface of the piston defines a lower side of the main combustion chamber;

an inlet valve and an exhaust valve arranged to regulate flow of air and exhaust gas to and from the main combustion chamber;

a pre-combustion chamber arranged in association with the main combustion chamber, wherein the pre-combustion chamber is provided with one or more orifices allowing fluid communication between the pre-combustion chamber and the main combustion chamber;

a fuel injector arranged to inject gaseous fuel into the pre-combustion chamber; and an igniter arranged to ignite a fuel-air mix present in the pre-combustion chamber, and wherein the fuel injector is adapted to generate a first injection in association with a compression stroke, and to inject a first amount of gaseous fuel into the pre-combustion chamber, wherein the first injection and the first amount of gaseous fuel are adapted so that an ignitable fuel-air mix is formed in the pre-combustion chamber but not in the main combustion chamber, wherein the igniter is adapted to ignite the ignitable fuel-air mix in the pre-combustion chamber formed by the first injection, and wherein the fuel injector is adapted to generate a second injection after ignition of the first amount of gaseous fuel, and to inject a second amount of gaseous fuel into the pre-combustion chamber, wherein the second injection and the second amount of gaseous fuel are adapted so that fuel is forced through the orifices into the main combustion chamber.

18. A vehicle provided with an internal combustion engine system according to claim 17.

* * * * *